US010599442B2

(12) United States Patent
Packer Ali et al.

(10) Patent No.: US 10,599,442 B2
(45) Date of Patent: Mar. 24, 2020

(54) SELECTABLE BOOT CPU

(71) Applicant: QUALCOMM Incorporated, San Diego, CA (US)

(72) Inventors: Dhamim Packer Ali, San Diego, CA (US); Yanru Li, San Diego, CA (US); Ashutosh Shrivastava, San Diego, CA (US); Azzedine Touzni, Carlsbad, CA (US); Mamta Desai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/448,232

(22) Filed: Mar. 2, 2017

(65) Prior Publication Data
US 2018/0253314 A1 Sep. 6, 2018

(51) Int. Cl.
*G06F 9/4401* (2018.01)

(52) U.S. Cl.
CPC .................. *G06F 9/4403* (2013.01)

(58) Field of Classification Search
CPC .. G06F 9/4405; G06F 12/084; G06F 11/1417; G06F 9/4401; G06F 9/4408; G06F 11/1428; G06F 11/2043; G06F 11/2242; G06F 9/4403; G06F 9/4406; G06F 9/441
See application file for complete search history.

(56) References Cited

U.S. PATENT DOCUMENTS

| | | | | | |
|---|---|---|---|---|---|
| 5,247,659 | A | * | 9/1993 | Curran | G06F 9/4408 713/1 |
| 5,673,388 | A | * | 9/1997 | Murthi | G11C 29/26 714/42 |
| 5,724,527 | A | * | 3/1998 | Karnik | G06F 9/4405 710/266 |
| 5,764,882 | A | * | 6/1998 | Shingo | G06F 11/1417 714/11 |
| 6,584,560 | B1 | * | 6/2003 | Kroun | G06F 9/4405 713/1 |
| 7,124,376 | B2 | | 10/2006 | Zaidi et al. | |
| 7,240,160 | B1 | * | 7/2007 | Hetherington | G06F 12/0817 711/119 |
| 7,685,354 | B1 | * | 3/2010 | Hetherington | G06F 12/084 711/163 |
| 8,055,822 | B2 | * | 11/2011 | Bernstein | G06F 9/3891 702/118 |
| 8,826,271 | B2 | | 9/2014 | Hussain et al. | |
| 9,323,876 | B1 | | 4/2016 | Lysaght et al. | |
| 9,477,807 | B1 | | 10/2016 | Harper et al. | |
| 2003/0093510 | A1 | * | 5/2003 | Cen | G06F 9/4405 709/223 |
| 2003/0233492 | A1 | * | 12/2003 | Schelling | G06F 9/4405 713/375 |

(Continued)

*Primary Examiner* — Jaweed A Abbaszadeh
*Assistant Examiner* — Brian J Corcoran
(74) *Attorney, Agent, or Firm* — Patterson & Sheridan, L.L.P

(57) ABSTRACT

Various additional and alternative aspects are described herein. In some aspects, the present disclosure provides a method of operating a system-on-chip (SoC). The method includes selecting a CPU core of a plurality of CPU cores of the SoC to boot the SoC based on information indicative of the quality of the plurality of CPU cores stored on the SoC. The method includes running boot code on the selected CPU.

18 Claims, 4 Drawing Sheets

(56) References Cited

U.S. PATENT DOCUMENTS

| | | | |
|---|---|---|---|
| 2004/0236935 A1* | 11/2004 | Collins | G06F 9/4405 713/1 |
| 2005/0060531 A1* | 3/2005 | Davis | G06F 9/4405 713/2 |
| 2006/0149954 A1* | 7/2006 | Hageman | G06F 9/4403 713/1 |
| 2009/0144531 A1* | 6/2009 | Harikumar | G06F 9/4401 713/2 |
| 2011/0022803 A1* | 1/2011 | Flemming | G06F 12/0811 711/122 |
| 2011/0107031 A1* | 5/2011 | Anand | G06F 12/084 711/122 |
| 2013/0080752 A1* | 3/2013 | Liao | G06F 9/4403 713/1 |
| 2013/0173958 A1* | 7/2013 | Atherton | G06F 12/084 714/19 |
| 2014/0006767 A1* | 1/2014 | Chang | G06F 9/4405 713/2 |
| 2014/0281457 A1* | 9/2014 | Weissmann | G06F 9/5077 713/2 |
| 2015/0067318 A1* | 3/2015 | Henry | G06F 1/3237 713/2 |
| 2015/0143044 A1* | 5/2015 | Gulati | G06F 12/084 711/121 |
| 2016/0180001 A1 | 6/2016 | Adler | |
| 2017/0300427 A1* | 10/2017 | Lin | G06F 12/128 |

* cited by examiner

SELECTABLE BOOT CPU

TECHNICAL FIELD

The teachings of the present disclosure relate generally to system-on-chip (SoC) integrated circuit design, and in certain aspects, to a flexible SoC design for selecting a boot central processing unit (CPU) and re-allocating resources on the SoC.

INTRODUCTION

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally includes multiple central processing unit (CPU) cores embedded in an integrated circuit or chip and coupled to a local bus. The CPU cores may further be arranged into or more computing clusters. The SoC may further generally include hardware components and other processors.

The SoC, like larger computing devices such as desktop and server computers relies on a boot sequence or a boot code upon powering up. The boot sequence is the initial set of operations that the SoC performs when power is first applied to the SoC. The boot code enables a (e.g., bootstrapping) process that initializes the SoC.

The boot code is typically stored in a read-only memory (ROM) for quick access, low complexity, spatial efficiency, low cost, and security reasons. The ROM, otherwise known as a masked or boot ROM, has its code hardwired and thus cannot be reprogrammed later. This allows greater security against reverse engineering of proprietary code and against cryptographic attacks.

In a typical SoC design process, the boot ROM is defined well before other portions of the SoC have been completed. Complexity in the circuit architectures, feature sets, next generation market trends, performance improvements, identified security vulnerabilities and pre-silicon verification limitations have led to conventional boot ROM designs with limited adaptability to enable changes post tape out of the SoC.

Further, in a typical SoC design, the boot code in the boot ROM is executed by a specific one of the CPU cores of the SoC, referred to as a boot CPU. The selection of the boot CPU is typically performed during design time of the SoC. For example, one of the CPU cores is hardcoded (e.g., using register-transfer level (RTL) design) as the boot CPU.

During manufacture of a SoC, not all CPU cores or hardware components of the SoC may meet production or engineering quality checks. For example, certain CPU cores or components may fail during production and accordingly do not function properly. Accordingly, sometimes the designated boot CPU may not be manufactured properly and may not function properly. Since the boot CPU is selected at design time, if the boot CPU fails during manufacturing, there is no method by which to properly boot the SoC. Therefore, the entire SoC may be discarded, even if other parts on the SoC are still viable, leading to significant waste.

Similarly, other components on the SoC may also not meet production or engineering quality. Accordingly, other components that rely on the failed components, even if viable, may also not be used, again leading to significant waste.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of operating a system-on-chip (SoC). The method includes selecting a CPU core of a plurality of CPU cores of the SoC to boot the SoC based on information indicative of the quality of the plurality of CPU cores stored on the SoC. The method includes running boot code on the selected CPU.

In some aspects, the present disclosure provides a system-on-chip (SoC). The SoC includes a plurality of CPU cores. The SoC includes a storage configured to store information indicative of a quality of the plurality of CPU cores. The SoC includes a controller configured to select a CPU core to boot the SoC based on the information indicative of the quality of the plurality of CPU cores, wherein the selected CPU is configured to run boot code.

In some aspects, the present disclosure provides a system-on-chip (SoC). The SoC includes means for storing information indicative of a quality of a plurality of CPU cores of the SoC. The SoC includes means for selecting a CPU core to boot the SoC based on the information indicative of the quality of the plurality of CPU cores. The SoC includes means for running boot code on the selected CPU.

In some aspects, the present disclosure provides a computer readable medium having instructions stored thereon for causing a system-on-chip (SoC) to perform a method. The method includes selecting a CPU core of a plurality of CPU cores of the SoC to boot the SoC based on information indicative of the quality of the plurality of CPU cores stored on the SoC. The method includes running boot code on the selected CPU.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein.

Figure 1:
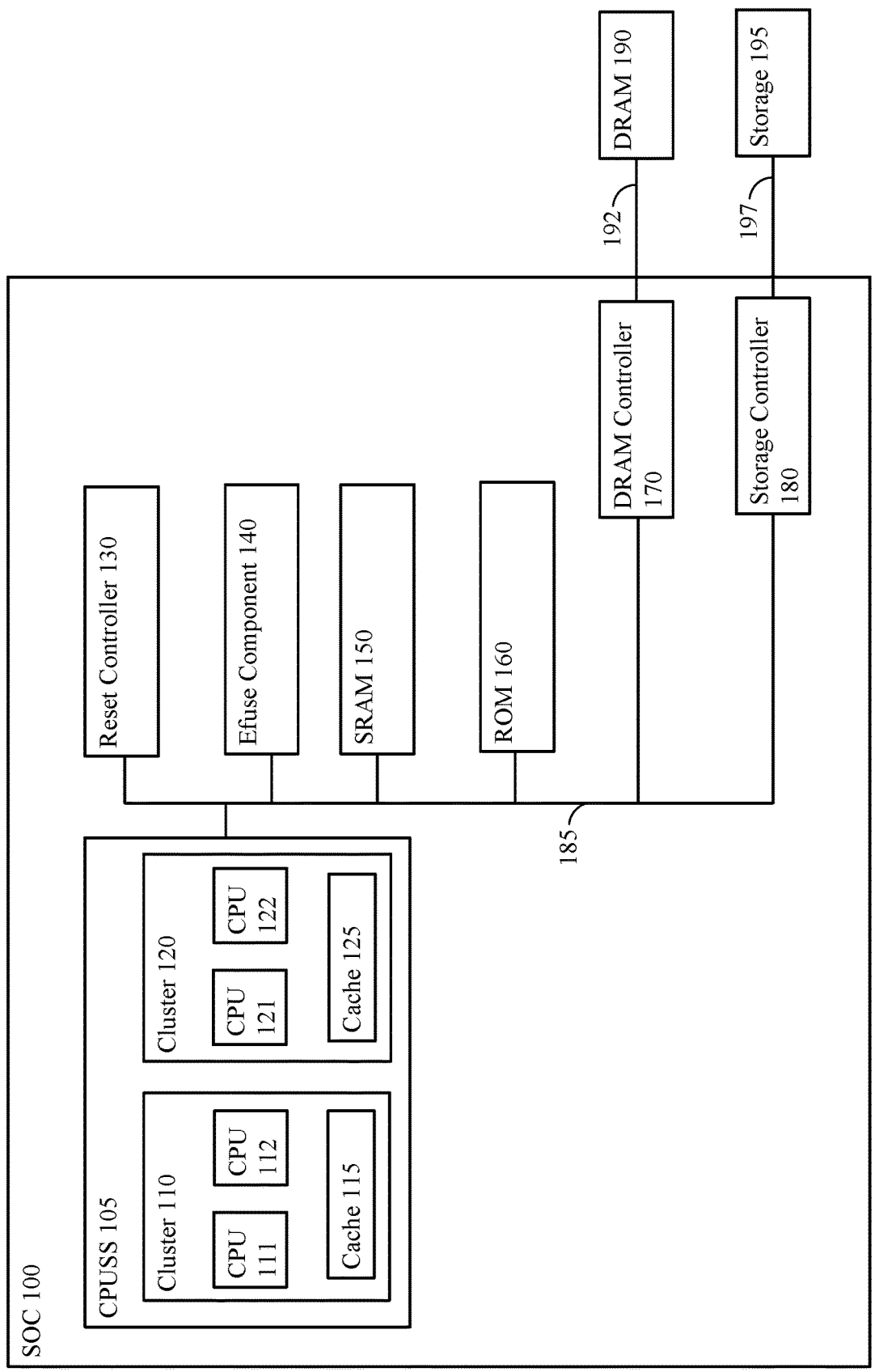
FIG. 1 is an illustration of an exemplary system-on-chip (SoC) integrated circuit design, in accordance with certain aspects of the present disclosure.

FIG. 1 is an illustration of an exemplary system-on-chip (SoC) integrated circuit design 100, in accordance with certain aspects of the present disclosure. As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big-.LITTLE design, etc.).

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores.

In certain aspects, each cluster and/or CPU core has associated status registers in the CPUSS 105 that indicates, for example, a number of CPU cores in the cluster, CPU resource information (e.g., cache information), CPU type information, etc. In some aspects, the register value is fixed at RTL design time when the SoC 100 is designed. The status register information may be used by an operating system (OS) (e.g., high level OS) executing on the CPUSS 105 for operation handling such as task scheduling, cache flushing, etc.).

The SoC 100 further includes a reset controller 130, an efuse component 140, static random-access memory (SRAM) 150, a read only memory (ROM) 160, a dynamic RAM (DRAM) controller 170, and a storage controller 180, which are all shown as on-chip components of the SoC 100. The on-chip components of the SoC 100 (e.g., components 105-180) are coupled together by a bus 185. Further, the DRAM controller 170 is coupled to a DRAM 190 off-chip from the SoC 100 by a bus 192. The storage controller 180 is coupled to a storage 195 (e.g., flash storage) off-chip from the SoC 100 by a bus 197. The SRAM 150, DRAM 190, and storage 195 may provide storage capacity for the SoC 100.

In some aspects, the reset controller 130, during system boot, is configured to release a CPU core for the CPUSS 105 from reset. In some aspects, the CPU core released is then configured to execute code/data (e.g., boot code) from the ROM 160 to boot the SoC 100. The ROM 160 (e.g., boot ROM) is an integrated circuit that includes the code or codes (e.g., boot code) that are executed by the CPUSS 105 during an initial power-on or upon a watchdog reset condition. In some aspects, the ROM is enabled in firmware.

In some aspects, the CPU core released by the reset controller 130 is decided at design time of the SoC 100 (i.e., before the SoC 100 is manufactured) and fixed in RTL. This CPU core may be referred to as a pre-defined boot CPU. Further, in certain such aspects, the code in the ROM 160 is customized for the pre-defined boot CPU (e.g., based on the CPU core type, CPU resources, etc.). For example, different CPUs or different clusters selected for boot may necessitate changes in the configuration parameters/resources during boot for the SoC. Accordingly, in certain aspects, the ROM 160 includes boot code specifically for the pre-defined boot CPU. As discussed above, in certain aspects, the pre-defined boot CPU, after the SoC 100 is manufactured, may not function properly. When the pre-defined boot CPU is malfunctioning, there is no method by which to properly boot the SoC 100. Therefore, the entire SoC may be discarded, even if other parts on the SoC 100 are still viable, leading to significant waste.

In some aspects, the CPU cores 111, 112, 121, and 122 are CPU cores also configured to run applications (e.g. application processors, APPS CPUs, etc.) and generally execute functions for the SoC 100. In other words, in certain aspects, the CPU cores 111, 112, 121, and 122 are not dedicated to booting the SoC 100, and also perform other functions. Accordingly, the design of the CPU cores 111, 112, 121, and 122 may be complex, thereby leading to a higher likelihood of failure during manufacture of the SoC 100. In certain aspects, though not shown, the SoC 100 may include a dedicated boot CPU that is less complex than CPU cores 111, 112, 121, and 122 and configured to solely boot the SoC 100. The reduced complexity of the dedicated boot CPU may reduce the likelihood that the boot CPU fails during manufacture. However, utilizing a dedicated boot CPU can increase boot time and overhead, for example, due to multiple boot stages required for features such as secure boot, encrypted boot, etc. as the system transitions from executing on the boot CPU to executing on the other full function CPU cores in the SoC 100. Further, the additional overhead in utilizing a dedicated boot CPU may also result in similar yield issues (i.e., higher likelihood of failure of the SoC design) and may result in further complexity (e.g., to ensure the additional CPU is always secure, etc.) in the SoC design, potentially requiring extra silicon cost.

Further, as discussed, in some aspects, the configuration and parameters of use of other resources of the SoC 100 are also pre-defined (e.g., cache operations defined in status register information). In certain aspects, one or more of an OS, boot code, bootloader firmware in the boot stack, etc. executing on the CPUSS 105 is configured to utilize the pre-defined status register information to determine how the resources are used. For example, as discussed, a certain cache may be configured to be utilized by only a particular CPU core and/or cluster. Accordingly, if all the particular CPU cores and/or clusters associated with a cache fail after manufacturing of the SoC 100, then the associated cache is not utilized, thereby wasting the resources of the cache. Further, if a cache associated with a CPU core and/or cluster fails, the CPU core and/or cluster may not have suitable performance to perform certain functions (e.g., boot, critical applications, etc.) and therefore the associated CPU core and/or cluster may not be used, further wasting resources.

Accordingly, certain aspects described herein relate to a flexible SoC design for selecting a boot CPU and repurposing other components of the SoC dynamically after manufacture of the SoC. In some such aspects, this may improve SoC yield, and utilization of resources of the SoC. For example, in some aspects, instead of having to discard an entire SoC because a pre-defined boot CPU fails after manufacture, the boot CPU may be selected from among the properly functioning CPU cores in the SoC. In addition, in some aspects, instead of having to not use certain resources or components of the SoC because related/associated components have failed, the resources or components of the SoC may be utilized for other purposes, thereby potentially improving performance or function of the manufactured SoC.

In certain aspects, after a SoC 100 is manufactured, each of the CPU cores 111, 112, 121, and 122 are quality screened (e.g., at the factory) using known CPU testing techniques (e.g., tests of whether the CPU and overall SoC meet target margins on voltage, temperature, current corner design, etc., tests that validate reliability of internal memories used in a CPU, etc.). Accordingly, the quality (e.g., whether the CPU core fails or not, whether certain resources used by the CPU core fail or not, etc.) of each CPU core is determined via the CPU testing. In certain aspects, the quality information of each of the CPU cores is stored in the SoC 100. For example, the quality information may be stored as a single bit for each CPU core that indicates whether the CPU core passes or fails screen, is available or not, etc. In certain aspects, the quality information is stored in a one-time programmable memory, such as by efuses of efuse component 140. In certain aspects, each efuse of the efuse component 140 corresponds to a particular CPU core/cluster. In some aspects, each efuse of the efuse component 140 is further associated with a memory (e.g., ROM, register, etc.) that includes an identifier of a particular CPU core/cluster. For example, in some aspects, each efuse may correspond to one bit, where a blown efuse (e.g., fuse bit=0) indicates the CPU core fails screening, and a no blown efuse (e.g., fuse bit=1) indicates the CPU core passes screening.

Figure 2:
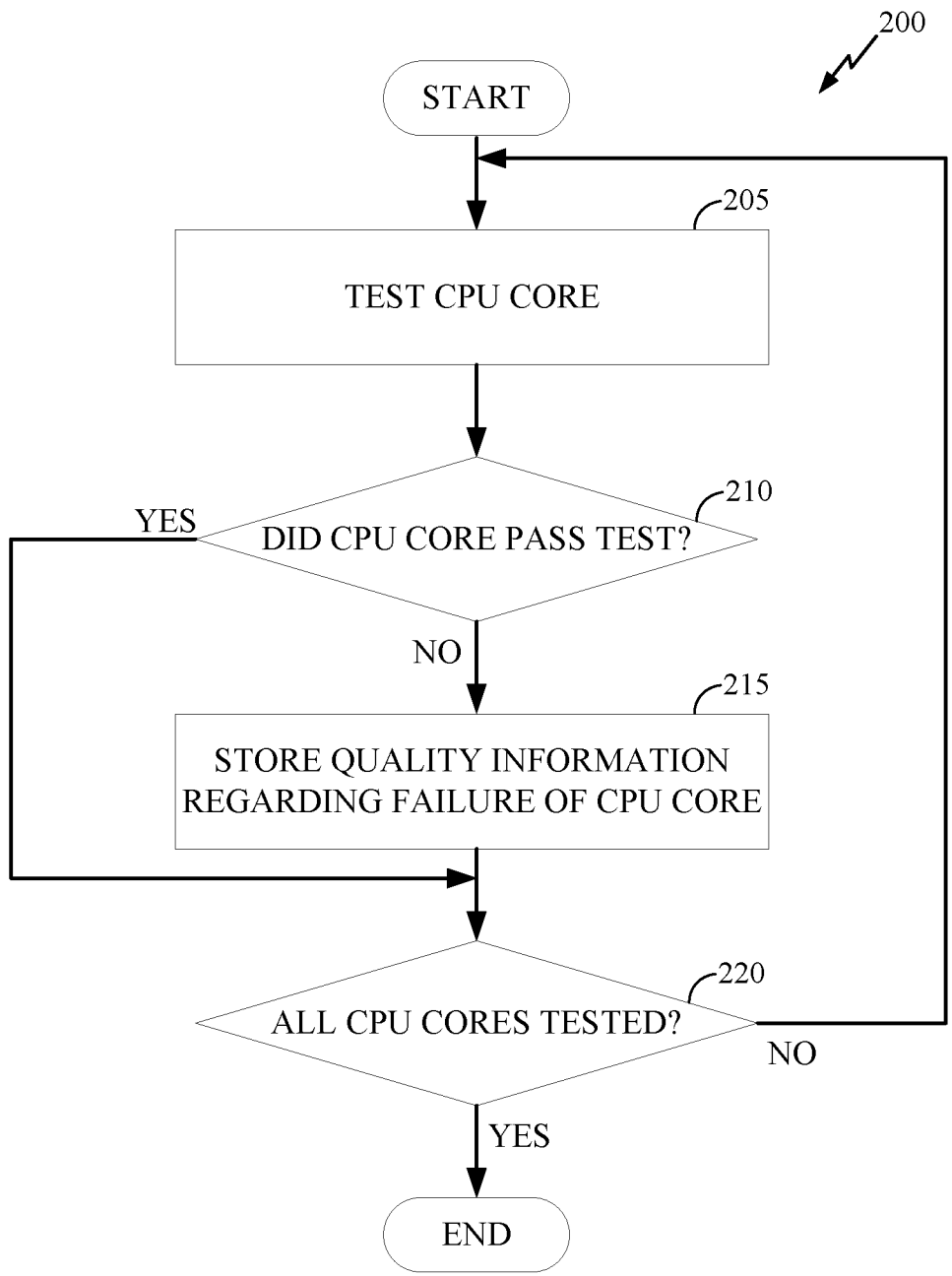
FIG. 2 illustrates example operations for testing CPU cores of a SoC, in accordance with certain aspects of the present disclosure.

FIG. 2 illustrates example operations for testing CPU cores of a SoC, in accordance with certain aspects of the present disclosure.

At 205, a test is run on a CPU core of the SoC. At 210, it is determined if the CPU core passes the test. If the CPU core passes the test, the process continues to 220. If the CPU core does not pass the test, the process continues to 215, where quality information indicating the CPU core has failed is stored. For example, a corresponding efuse of the CPU core in the efuse component 140 is blown indicating the CPU core as failed. The process then continues to 220.

At 220, it is determined if all CPU cores of the SoC have been tested. If it is determined that all CPU cores of the SoC have been tested, the process ends. If it is determined that not all CPU cores of the SoC have been tested, the process returns to 205 where another untested CPU core is tested.

In certain aspects, at runtime of the SoC 100 (e.g., when the SoC 100 is powered on, reset, boots, etc.), the reset controller 130 of the SoC 100 checks the efuse component 140 for the quality information of each of the CPU cores 111, 112, 121, and 122 of the CPUSS 105 and determines which CPU core to use as the boot CPU for the SoC 100 based on the quality information. For example, the quality information may be checked in a some order, and the first CPU core with a suitable quality level (e.g., threshold level, indication of functionality, etc.) may be selected as the boot CPU. The reset controller 130 then releases the determined CPU core from reset, and the determined CPU core begins executing the boot code from ROM 160. In certain aspects, the boot CPU may be manually selected (e.g., manually setting quality information in the efuse component 140 to ensure a particular CPU core is used as the boot CPU), such as for testing the SoC 100 under different configurations.

In certain aspects, the ROM 160 includes code for detecting the CPU core/cluster executing the boot code. For example, the ROM 160 may include code that when executed by the determined CPU core causes the determined CPU core to read the identifier from the efuse component 140 associated with the determined CPU core. In certain aspects, as discussed, the different CPU cores and/or clusters may use different configuration parameters/resources during boot. Accordingly, depending on the CPU core selected as the boot CPU, the boot code executed by the boot CPU may need to be different. Therefore, in certain aspects, the ROM 160 may include different code (e.g., parameters, configurations, etc.) for booting on different CPU cores of the SoC 100. Thus, when the boot CPU executes the code of the ROM 160, and determines the CPU core executing the ROM 160, the code of the ROM 160 may cause the boot CPU to execute the appropriate portion of the boot code for the boot CPU.

In certain aspects, the SoC 100 (e.g., the boot CPU) is further configured to (e.g., based on code in the ROM 160) pass the quality information of the CPU cores of the CPUSS

105 to an OS or other operations in the boot chain executing on the SoC 100. For example, the SoC 100 may store the quality information in memory (e.g., SRAM 150, DRAM 190, storage 195, etc.). The OS or other operations may utilize the quality information to make further decisions when operating the SoC 100, such as which CPU core to schedule for a task, etc. For example, the OS may not schedule tasks to CPU cores indicated as failing, regardless of information stored in status registers as discussed.

In certain aspects, as discussed, other resources on the SoC 100 (e.g., cache, such as cache 115, 125, etc.) may also be repurposed based on the quality screening of the SoC 100. For example, as discussed, different caches (e.g., levels of caches, such as L1, L2, and L3) may be dedicated to particular CPU cores and/or clusters. In certain aspects, one level of cache (e.g., L1) is cache dedicated to a particular CPU core. In certain aspects, one level of cache (e.g., L2) is cache dedicated to the CPU cores of a single cluster. In certain aspects, one level of cache (e.g., L3) is cache for all clusters. Normally, if all the CPU cores (e.g., CPU cores 111 and 112) from a cluster (e.g., cluster 110) fail, the cache (e.g., cache 115) associated with the cluster may not be used, and is wasted during operation of the SoC 100.

Accordingly, in certain aspects, caches (or other resources) allocated to one or more CPU cores/clusters at design time may be repurposed and allocated to other CPU cores/clusters accessible by bus paths on the SoC 100 at runtime based on the quality information of the SoC 100. In certain aspects, additional bus paths may be added to the SoC 100 to reduce latency in accessing the repurposed resources. In certain aspects, an OS executing on the SoC 100, or the boot code, bootloader firmware, etc., allocates the resources based on the quality information stored in the efuse component 140 or other storage. For example, if the CPU cores 111 and 112 of cluster 110 fail, then the OS may direct the CPU cores 121 and 122 of cluster 120 to utilize the cache 115 for storage, though the cache 115 may normally only be utilized by cluster 110. In another example, if the CPU core 111 fails, for example, and has a dedicated cache, and CPU core 112 is still functional, the dedicated cache may be reallocated to CPU core 112. It should be noted that repurposing of resources between CPU cores may be done in any suitable manner, in addition to the illustrative examples discussed herein.

In certain aspects, if certain caches (or other resources) that are allocated to a particular CPU core or cluster are indicated as failing in the SoC 100 during quality screening, that particular CPU core/cluster may not be used for boot, but may still be used for other tasks by utilizing other caches (e.g., a cache level associated with all clusters, cache associated with a non-functioning CPU core, etc.). For example, if cache 115 fails, CPU cores 111 and 112 may utilize cache 125 or another cache of the CPUSS 105. In certain aspects, accessing such a repurposed cache may add latency for transfer of data between the cache and the CPU core. Accordingly, in certain aspects, such CPU cores may be indicated in the quality information as having reduced performance, and may be used for only certain tasks (e.g., not for boot or other critical tasks).

Figure 3:
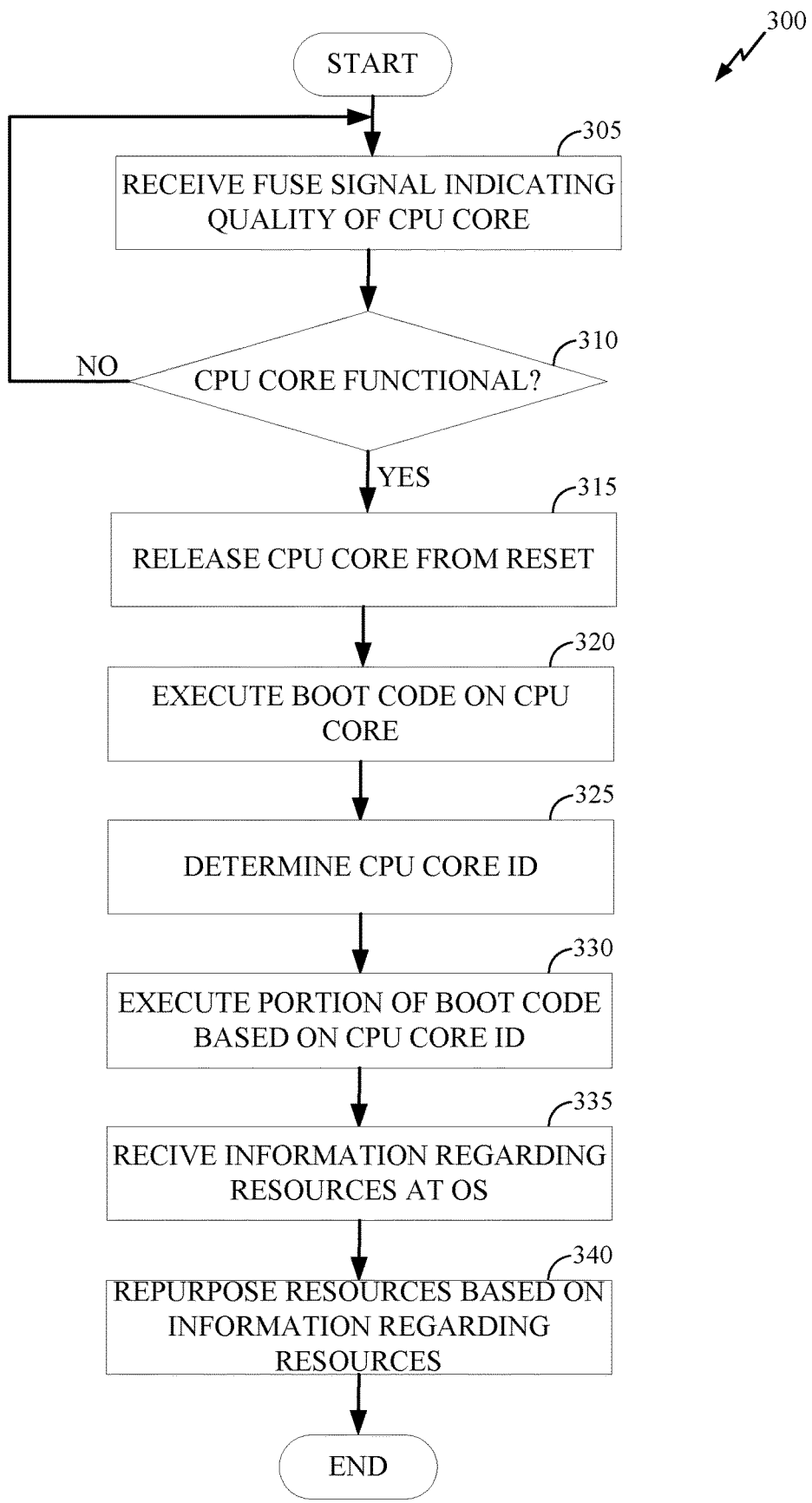
FIG. 3 illustrates example operations for dynamically utilizing a SoC, in accordance with certain aspects of the present disclosure.

FIG. 3 illustrates example operations for dynamically utilizing a SoC, in accordance with certain aspects of the present disclosure. For example, the operations of FIG. 3 may be performed by the SoC 100, or another suitable SoC.

At 305, the reset controller 130 receives a fuse value signal indicating the quality information of a CPU core of the CPUSS 105 from the efuse component 140. At 310, the reset controller determines whether the fuse value signal indicates that CPU core is functional or not. If at 310, the reset controller determines that the fuse value signal indicates the CPU core is not functional, the process returns to 305 where another fuse value signal indicating the quality information of a different CPU core is received by the reset controller 130. If at 310, the reset controller determines that the fuse value signal indicates the CPU core is functional, the process continues to 315.

At 315, the reset controller releases the functional CPU core from reset. At 320, the CPU core start executing the boot code stored in ROM 160. At 325, the CPU core determines its identifier. At 330, the CPU core executes the portion of the boot code associated with its identifier and boots to the OS of the SoC 100.

At 335, the OS receives information (e.g., from the bootloader) regarding the functionality of resources, CPU cores, etc., of the SoC 100. At 340, the OS repurposes resources (e.g., cache) of non-functional CPU cores to other CPU cores of the SoC 100. As discussed, additionally or alternatively to repurposing resources by the OS, one or more of the boot code, bootloader firmware, etc. may also repurpose resources, such as for improving performance (e.g., boot time) for other processes (e.g., functions executed prior to OS execution).

Figure 4:
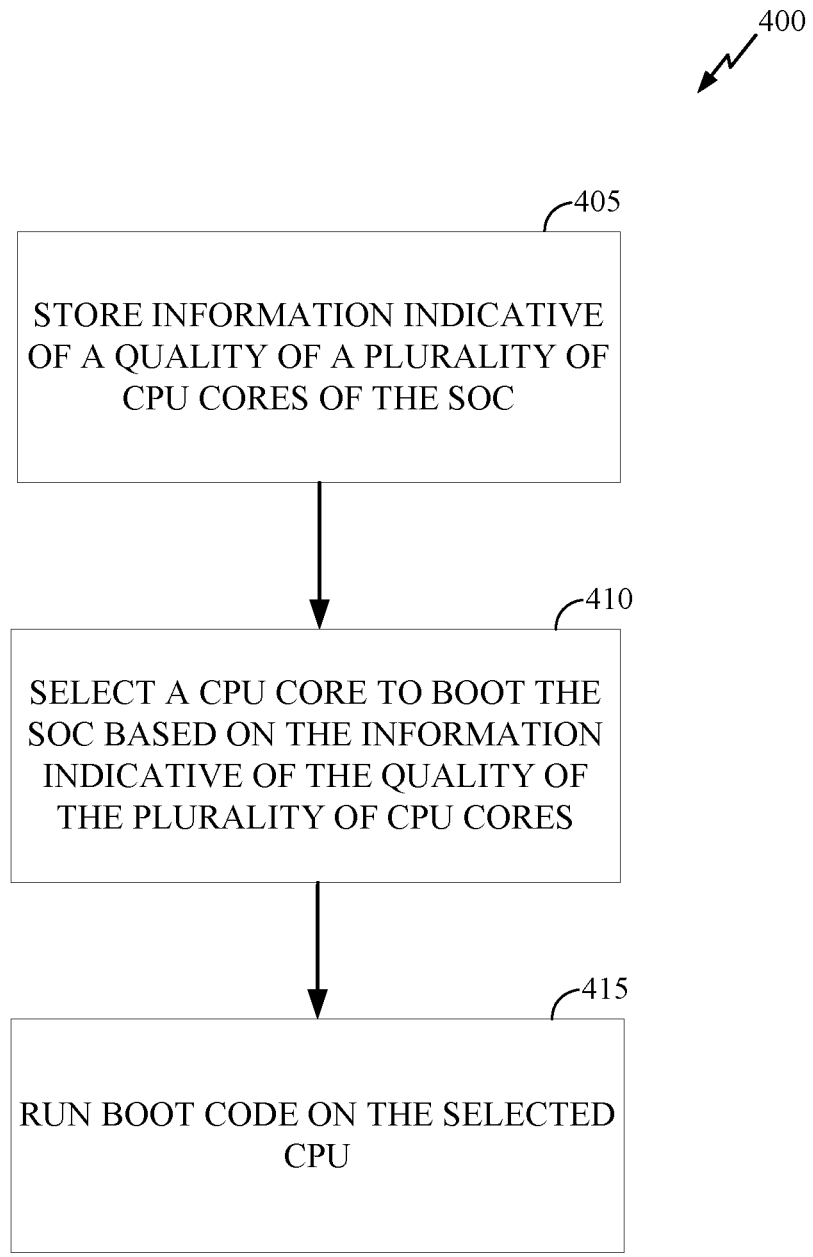
FIG. 4 illustrates example operations for dynamically utilizing a SoC, in accordance with certain aspects of the present disclosure.

FIG. 4 illustrates example operations for dynamically utilizing a SoC, in accordance with certain aspects of the present disclosure. For example, the operations of FIG. 4 may be performed by the SoC 100, or another suitable SoC.

At 405, information indicative of a quality of a plurality of CPU cores of the SoC 100 is stored in the SoC 100. For example, quality information of CPU cores of the CPUSS 105 is stored in the efuse component 140. Further, at 410, a CPU core is selected to boot the SoC based on the information indicative of the quality of the plurality of CPU cores. For example, the reset controller 130 selects a boot CPU based on the quality information stored in the efuse component 140. Continuing, at 415, the selected CPU core runs boot code. For example, the selected CPU core runs a portion of the boot code stored in ROM 160 that is associated with the selected CPU core.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of operating a system-on-chip (SoC), the method comprising:
    selecting a CPU core of a plurality of CPU cores of the SoC to boot the SoC based on information indicative of a quality of the plurality of CPU cores stored on the SoC,
        wherein the information indicative of the quality of the plurality of CPU cores indicates a first cache associated with a first CPU core is not functional,
        wherein the first CPU core is not selected to boot the SoC based on the first cache associated with the first CPU core not being functional;
    running boot code on the selected CPU core;
    allocating a second cache to the first CPU core,
        wherein in response to allocating the second cache to the first CPU core, updating the information indicative of the quality of the plurality of CPU cotes to indicate that the first CPU core operates at a reduced performance level:
    utilizing the first CPU core having the allocated second cache for operations other than running the moot code.

2. The method of claim 1, wherein the information indicative of the quality of the plurality of CPU cores is based on a screening of the plurality of CPU cores.

3. The method of claim 1, further comprising allocating resources on the SoC to the plurality of CPU cores based on the information indicative of the quality of the plurality of CPU cores.

4. The method of claim 3, wherein the resources comprise at least one cache.

5. The method of claim 1, further comprising storing the information indicative of the quality of the plurality of CPU cores in one or more efuses.

6. The method of claim 5, wherein a blown efuse indicates a corresponding CPU core is not functional.

7. The method of claim 5, wherein each of the one or more efuses is associated with an identifier of a CPU core stored in a memory.

8. The method of claim 1, further comprising passing the information indicative of the quality of the plurality of CPU cores to an operating system executing on the SoC.

9. A system-on-chip (SoC) comprising:
a plurality of CPU cores;
a storage configured to store information indicative of a quality of the plurality of CPU cores; and
circuitry configured to:
select a CPU core to boot the SoC based on the information indicative of the quality of the plurality of CPU cores,
wherein the information indicative of the quality of the plurality of CPU cores indicates a first cache associated with a first CPU core is not functional,
wherein the first CPU core is not selected to boot the SoC based on the first cache associated with the first CPU core not being functional,
wherein boot code is run on the selected CPU core; and
allocate a second cache to the first CPU core,
wherein in response to allocating the second cache to the first CPU core, update the information indicative of the quality of the plurality of CPU cores to indicate that the first CPU core operates at a reduced performance level,
wherein the first CPU core having the allocated second cache is utilized for operations other than running boot code.

10. The SoC of claim 9, wherein the information indicative of the quality of the plurality of CPU cores is based on a screening of the plurality of CPU cores.

11. The SoC of claim 9, wherein the storage is further configured to store information regarding allocating resources on the SoC to the plurality of CPU cores.

12. The SoC of claim 11, wherein the resources comprise at least one cache.

13. The SoC of claim 9, wherein the storage comprises one or more efuses.

14. The SoC of claim 13, wherein a blown efuse indicates a corresponding CPU core is not functional.

15. The SoC of claim 13, wherein each of the one or more efuses is associated with an identifier of a CPU core stored in a memory.

16. The SoC of claim 9, wherein the circuitry is further configured to pass the information indicative of the quality of the plurality of CPU cores to an operating system executing on the SoC.

17. A system-on-chip (SoC) comprising:
means for storing information indicative of a quality of a plurality of CPU cores of the SoC;
means for selecting a CPU core to boot the SoC based on the information indicative of the quality of the plurality of CPU cores,
wherein the information indicative of the quality of the plurality of CPU cores indicates a first cache associated with a first CPU core is not functional,
wherein the first CPU core is not selected to boot the SoC based on the first cache associated with the first CPU core not being functional;
means for allocating a second cache to the first CPU core,
wherein in response to allocating the second cache to the first CPU core, updating the information indicative of the quality of the plurality of CPU cores to indicate that the first CPU core operates at a reduced performance level;
means for running boot code on the selected CPU core; and
means for utilizing the first CPU core having the allocated second cache for operations other than running the boot code.

18. A non-transitory computer readable medium having instructions stored thereon for causing a system-on-chip (SoC) to perform a method, the method comprising:
selecting a CPU core of a plurality of CPU cores of the SoC to boot the SoC based on information indicative of a quality of the plurality of CPU cores stored on the SoC,
wherein the information indicative of the quality of the plurality of CPU cores indicates a first cache associated with a first CPU core is not functional,
wherein the first CPU core is not selected to boot the SoC based on the first cache associated with the first CPU core not being functional;
allocating a second cache to the first CPU core,
wherein in response to allocating the second cache to the first CPU core, updating the information indicative of the quality of the plurality of CPU cores to indicate that the first CPU core operates at a reduced performance level:
running boot code on the selected CPU core; and
utilizing the first CPU core having the allocated second cache for operations other than running the boot code.

* * * * *